United States Patent [19]
Heavner

[11] Patent Number: 5,385,379
[45] Date of Patent: Jan. 31, 1995

[54] SPLIT-PANEL WINDSHIELD ASSEMBLY FOR ATTACHMENT TO A RECREATION VEHICLE

[75] Inventor: Edward J. Heavner, Concord, N.C.

[73] Assignee: Plastics Manufacturing, Inc., Harrisburg, N.C.

[21] Appl. No.: 246,945

[22] Filed: May 20, 1994

Related U.S. Application Data

[63] Continuation-in-part of Ser. No. 131,654, Oct. 5, 1993.

[51] Int. Cl.$^6$ ............................................. B60J 1/04
[52] U.S. Cl. ................... 296/84.1; 296/77.1; 296/86; 280/DIG. 5
[58] Field of Search ............ 296/84.1, 77.1, 79, 296/86, 87, 88, 96.21, 96.2; 280/DIG. 5

[56] References Cited

U.S. PATENT DOCUMENTS 4,773,695  9/1988  Jones et al. ............... 296/96.21 X
5,195,797  3/1993  Hobbs ........................ 296/77.1

Primary Examiner—Joseph Pape
Attorney, Agent, or Firm—W. Thad Adams, III

[57] ABSTRACT

An improved split windshield-assembly of the type for attachment to a pair of laterally spaced and vertically extending front support posts of a recreation vehicle includes a lower windshield panel and an upper windshield panel. The upper windshield panel is pivotally connected along a top side edge of the lower windshield panel, and is movable from a closed position to an open position. The improvement in the windshield assembly includes a retainer clip and fastener located on an upper portion of a least one of the front support posts to releasably hold the upper windshield panel in the closed position.

12 Claims, 6 Drawing Sheets

SPLIT-PANEL WINDSHIELD ASSEMBLY FOR ATTACHMENT TO A RECREATION VEHICLE

This application is a continuation-in-part application of U.S. Ser. No. 131,654 filed on Oct. 5, 1993. The invention relates to an improved split-panel windshield assembly for being attached to a recreation vehicle, such as a golf cart. The split-panel windshield assembly includes a retainer clip for holding the upper windshield panel in a closed position above and coplanar with the lower windshield panel. The retainer clip is durable, and conveniently and securely attaches to the front support post of the golf cart without the aid of any tools or screws.

TECHNICAL FIELD AND BACKGROUND OF THE INVENTION

According to one prior art windshield assembly, a windshield retaining device is attached to the upper windshield panel, and includes a pair of resilient legs for extending around and frictionally engaging a portion of the front support post of the golf cart. The resilient legs of the prior art retainer clip are intended to substantially align with the front support post such that the clip pushes onto and attaches itself to the support post when the upper windshield panel is moved into the closed position.

This prior art retainer clip includes limitations. For example, because of alignment error and user abuse, the legs of the clip frequently break off or become damaged. In addition, the resilience of the legs will diminish over a relatively short period of time, thus lessening the ability of the retainer clip to effectively hold the upper windshield panel in the closed position when the golf cart is in motion.

The present invention overcomes the problems of the prior art by providing a windshield assembly including a retainer clip which attaches to the front support posts of the golf cart, as opposed to the upper windshield panel. The retainer clip adjusts to permit movement of the upper windshield panel between open and closed positions, and is easily attached to the front support by a fastener.

SUMMARY OF THE INVENTION

Therefore, it is an object of the invention to provide an improved split windshield assembly which is easily attached to the front support posts of a golf cart.

It is another object of the invention to provide a windshield assembly including one or more retainer clips for holding the upper windshield panel in a closed position.

It is another object of the invention to provide a windshield assembly wherein the retainer clip includes a flexible windshield retaining member moveable from panel holding position to panel release position.

It is another object of the invention to provide a windshield assembly including a removable fastener for easily and securely attaching the retainer clip to the front support post of the golf cart.

It is another object of the invention to provide a windshield assembly wherein the retainer clip and fastener are connected together by a rubber cement adhesive.

These and other objects of the present invention are achieved in the preferred embodiments disclosed below by providing an improved split windshield assembly of the type for attachment to a pair of laterally spaced and vertically extending front support posts of a recreation vehicle. The windshield assembly includes a lower windshield panel for being attached to a lower portion of the front support posts and an upper windshield panel. The upper windshield panel is pivotally connected along a top side edge of the lower windshield panel, and is movable from a closed position generally above and coplanar with the lower windshield panel to an open position generally forward of and beside the lower windshield panel. The improvement in the windshield assembly includes retaining means located on an upper portion of a least one of the front support posts to releasably hold the upper windshield panel in the closed position.

The holding means includes a fastener and a retainer clip. The fastener has a web panel and first and second spaced-apart legs connected to the web panel. The first and second legs extend outwardly from the web panel to releasably embrace the front support post of the recreation vehicle.

The retainer clip includes a flexible windshield retaining member carried by one of the first and second legs in spaced-apart relation thereto. The windshield retaining member and the one leg define a windshield panel retaining space therebetween. The windshield retaining member is movable from a panel holding position adjacent to the upper windshield panel for holding the upper windshield panel in the closed position, to a panel release position generally perpendicular to the upper windshield panel for permitting outward movement of the upper windshield panel to the open position.

According to one preferred embodiment of the invention, the retainer clip further includes an attachment member mounted to one of the first and second legs. The attachment member is integrally formed at one end thereof with the windshield retaining member. The attachment member and the windshield retaining member cooperate to releasably hold the upper windshield panel therebetween in the windshield panel retaining space.

Preferably, the attachment member is mounted to one of the first and second legs by a rubber cement adhesive.

According to another preferred embodiment of the invention, an extension is integrally formed at one end thereof with the attachment member and extends perpendicular to the attachment member along an outside surface of the web panel of the fastener.

Preferably, the extension is mounted to the outside surface of the web panel by a rubber cement adhesive.

According to yet another preferred embodiment of the invention, the fastener further includes a backing connected to the web panel and positioned in spaced-apart relation thereto. The backing extends substantially parallel to the web panel, and defines a space therebetween for receiving and holding the extension.

According to yet another preferred embodiment of the invention, the retainer clip includes at least one hand grip located on an outer surface of the windshield retaining member for receiving pressure applied by the thumb or forefinger of the user to flex the windshield retaining member outwardly from the panel holding position to the panel release position.

According to yet another preferred embodiment of the invention, the retainer clip includes first and second spaced apart hand grips integrally formed with an outer surface of the windshield retaining member for receiving pressure applied by the thumb or forefinger of the user to flex the windshield retaining member outwardly from the panel holding position to the panel release position. The first hand grip is located generally at the free end of the windshield retaining member, and the second hand grip is located generally at the opposite end of the windshield retaining member.

Preferably, the retainer clip is constructed of rubber.

Preferably, the fastener is constructed of a synthetic resin.

Preferably, the retainer clip includes an ultraviolet inhibitor to protect the retainer clip from damage and wear caused by the sun.

BRIEF DESCRIPTION OF THE DRAWING

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
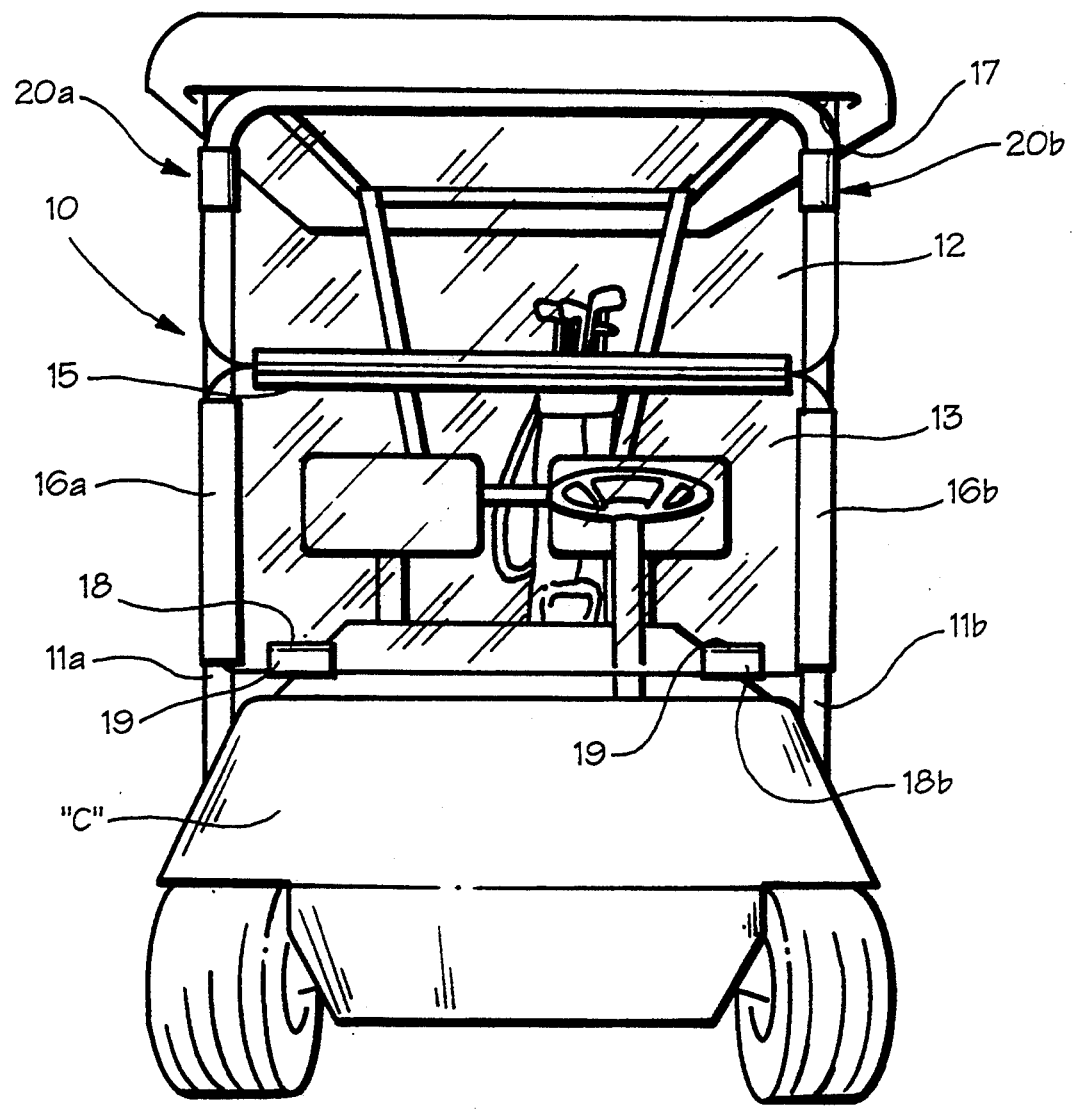
FIG. 1 is a front perspective view of a golf cart having a windshield assembly according to the present invention attached to the respective front support posts of the golf cart.

Referring now specifically to the drawings, an improved split windshield assembly according to the present invention is illustrated in FIG. 1 and shown generally at reference numeral 10. The windshield assembly 10 is particularly suited for attachment to the front vertical support posts 11A and 11B of a recreation vehicle, such as a golf cart "C".

As shown in FIG. 1, the windshield assembly 10 includes an upper and lower windshield panel 12 and 13 connected together by a laterally-extending hinge 15. The hinge 15 permits movement of the upper windshield panel 12 from a closed position, above and coplanar with the lower windshield panel 13 (See FIG. 1), to an open position generally forward of and beside the lower windshield panel 13. Preferably, the hinge 15 is manufactured by Westedge, Incorporated, and sold under the trademark "Flex-Fold."

A pair of elongate post fixtures 16A and 16B serve to permanently attach the lower windshield panel 13 to a lower half of the respective support posts 11A and 11B. The post fixtures 16A,B are known in the industry, and are typically constructed of a polyvinyl chloride resin.

When in the open position (not shown), the upper windshield panel 12 is secured to the lower windshield panel 13 by a pair of flexible windshield clamps 18A and 18B. Each clamp 18A,B has a narrow opening 19 formed therein for receiving and pinching an outwardly curved top edge 17 of the upper windshield panel 12. Preferably, the clamps 18A, B are constructed of a flexible material, such as neoprene rubber, and include an ultraviolet inhibitor to protect the clamps 18A,B from sun damage and wear.

When in the closed position shown in FIG. 1, the upper windshield panel 12 is releasably held coplanar with the lower windshield panel 13 by a pair of detachable retainer clips 20A and 20B. The retainer clip 20A and attachment thereof to the front support post 11A is illustrated in FIGS. 2-7. Although the retainer clip 20A is shown and described below with reference to the drawings, it is understood that the windshield assembly 10 preferably includes the identical second retainer clip 20B for being attached to the second vertical support post 11B in an identical manner, as shown in FIG. 1.

Figure 2:
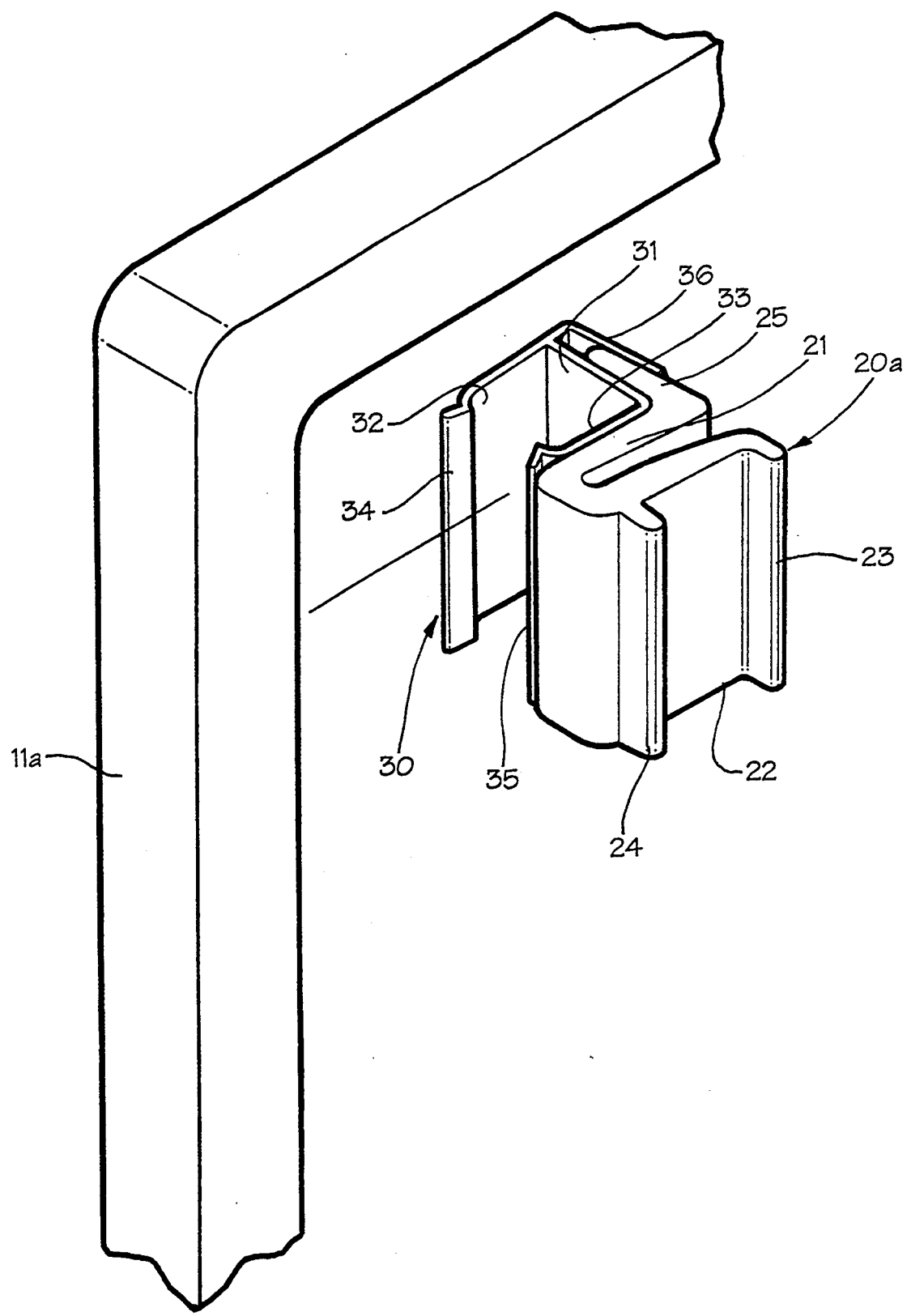
FIG. 2 is a fragmentary perspective view of the fastener and retainer clip connected together, showing the orientation of these elements prior to attachment to the front support post of the golf cart.

As best shown in FIG. 2, the retainer clip 20A is removably attached to the front support post 11A. by a fastener 30. The fastener 30 includes a web panel 31 and first and second resilient legs 32 and 33. The first and second legs 32 and 33 extend outwardly from the web panel 31, and are angled slightly inward for increasing the holding strength of the fastener 30 when attached to the support post 11A. Preferably, the free ends of the legs 32 and 33 include molded flanges 34 and 35 which converge towards each other to define an opening of reduced dimension. The flanges and 35, together with the resilience of the legs 32 and 33, facilitate a manual "snap" attachment of the fastener 30 to the support post 11A. FIG. 2 illustrates the orientation of the fastener 30 and retainer clip 20A just prior to attachment to the front support post 11A. The fastener 30 is preferably constructed of polyvinyl chloride resin, or other similar synthetic resin.

Preferably, the retainer clip 20A is constructed of relatively soft material, such as neoprene (rubber), urethane, EDPM, or vinyl, and may include an ultraviolet inhibitor for protection from sun damage and wear. According to one embodiment, the retainer clip 20A includes both an attachment member 21 and a flexible windshield retaining member 22. The attachment member 21 is connected to the outer surface of the second leg 33 of the fastener 30 by a rubber cement adhesive, or the like. The windshield retaining member 22 is integrally-formed with one end of the attachment member 21 and cooperates with the attachment member 21 to define a windshield retaining space therebetween. As illustrated in FIGS. 4-7, the windshield retaining member 22 is moveable by flexing from a panel holding position, shown in FIGS. 4 and 6, to a panel release position shown in FIGS. 5 and When the windshield retaining member 22 is in the flexed panel-release position, the upper windshield panel 12 can freely pivot outwardly to the open position as discussed above.

First and second spaced-apart hand grips 23 and 24 may be integrally-formed with the outer surface of the windshield retaining member 22 to provide convenient means for gripping and moving the windshield retaining member 22. The hand grips 23 and 24 act to receive pressure from the thumb or forefinger of the user as the user flexes the windshield retaining member 22 outwardly from the panel holding position to the panel release position. The first hand grip 23 is preferably located at the free end of the windshield retaining member 22, while the second hand grip 24 is located generally at the opposite end of the windshield retaining member 22.

Preferably, the retainer clip 20A further includes an extension 25 integrally-formed with one end of the attachment member 21, and extending perpendicular to the attachment member 21 along the outer surface of the web panel 31. Like the attachment member 21, the extension 25 is connected to the fastener 30 by a rubber cement adhesive. The extension 25 helps strengthen the bond between the retainer clip 20A and the fastener 30.

Figure 3:
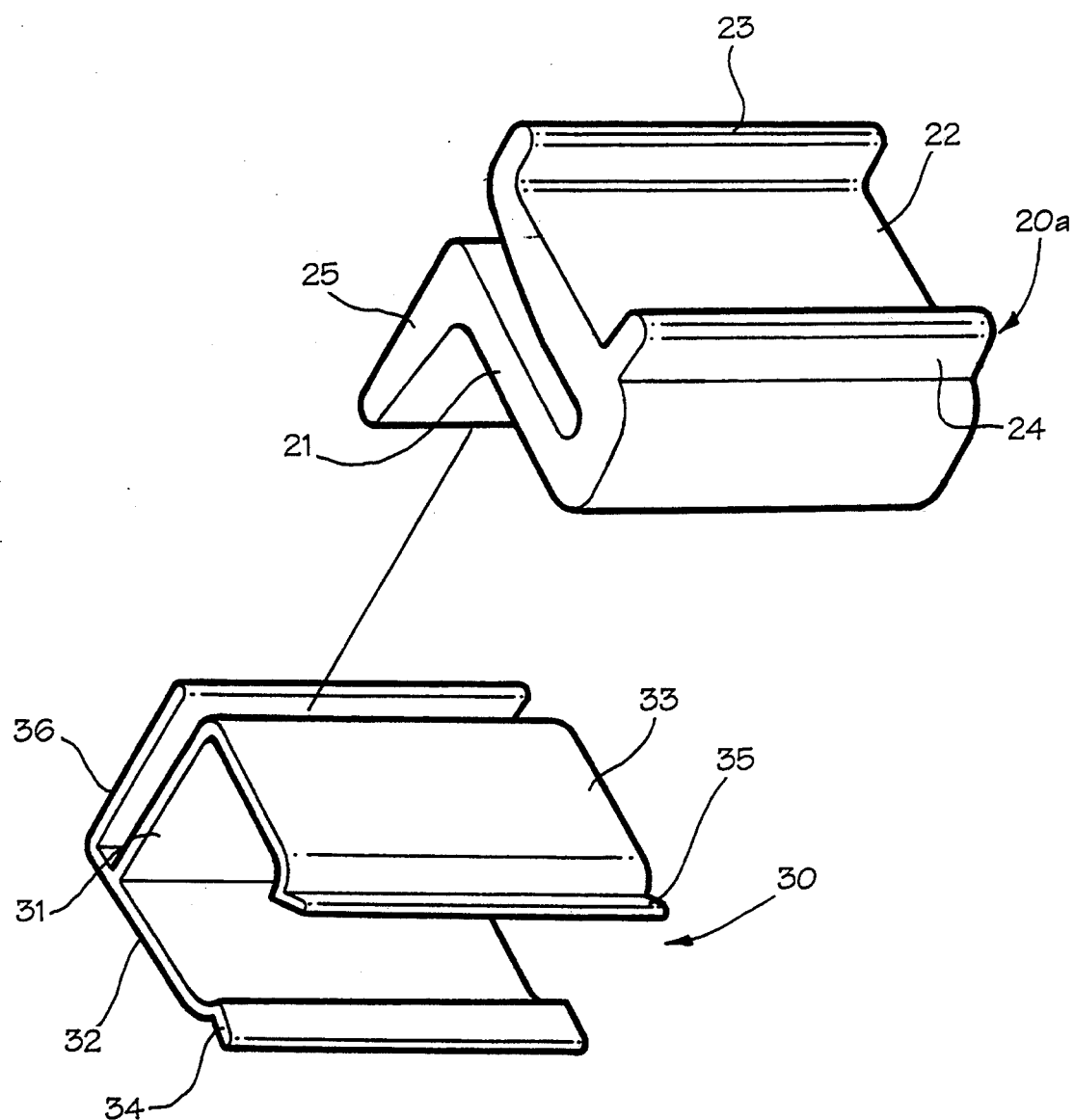
FIG. 3 is a perspective view of fastener and retainer clip separated.
Figure 4:
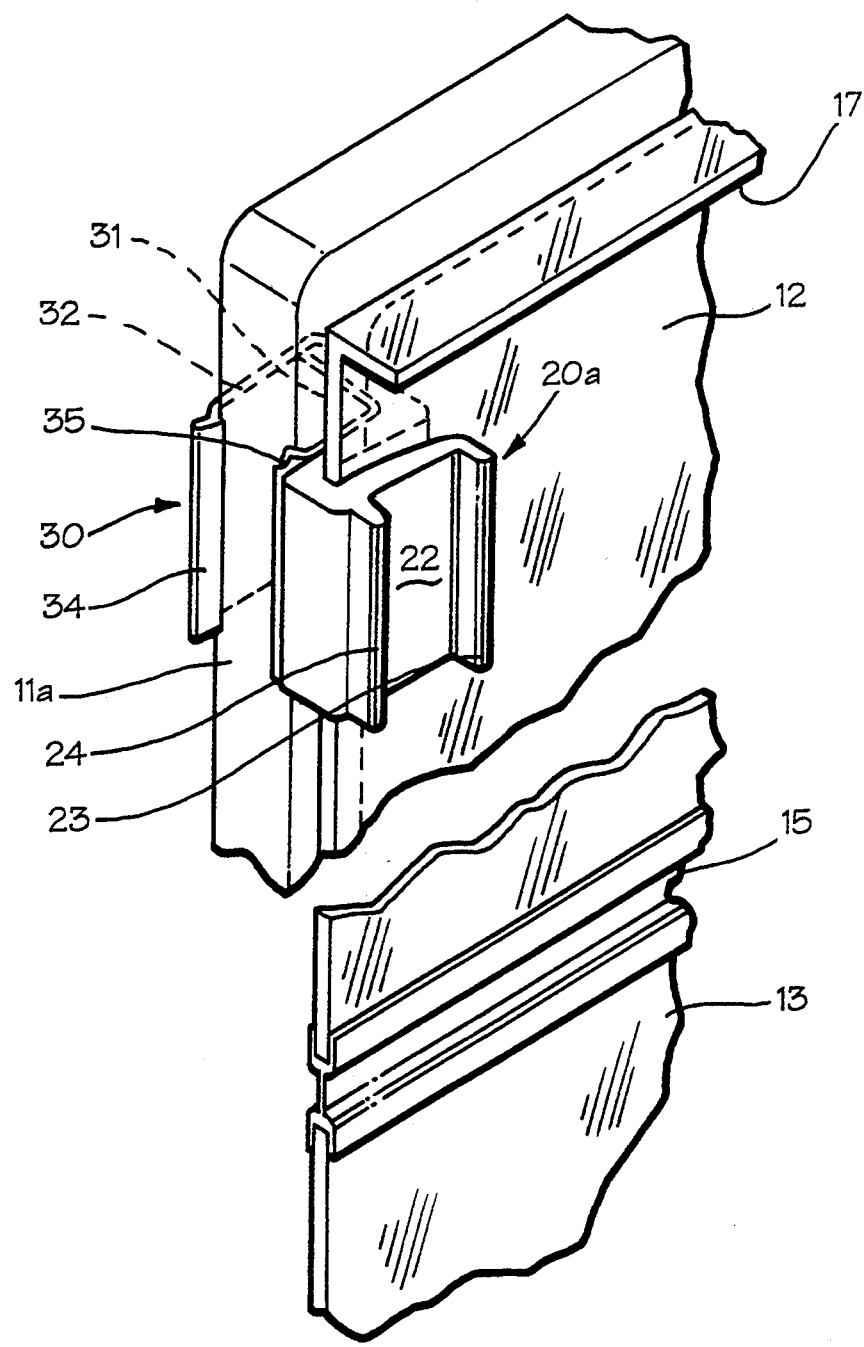
FIG. 4 is a fragmentary perspective view of the windshield assembly showing the upper windshield panel held in the closed position by the windshield retaining member of the retainer clip.
Figure 5:
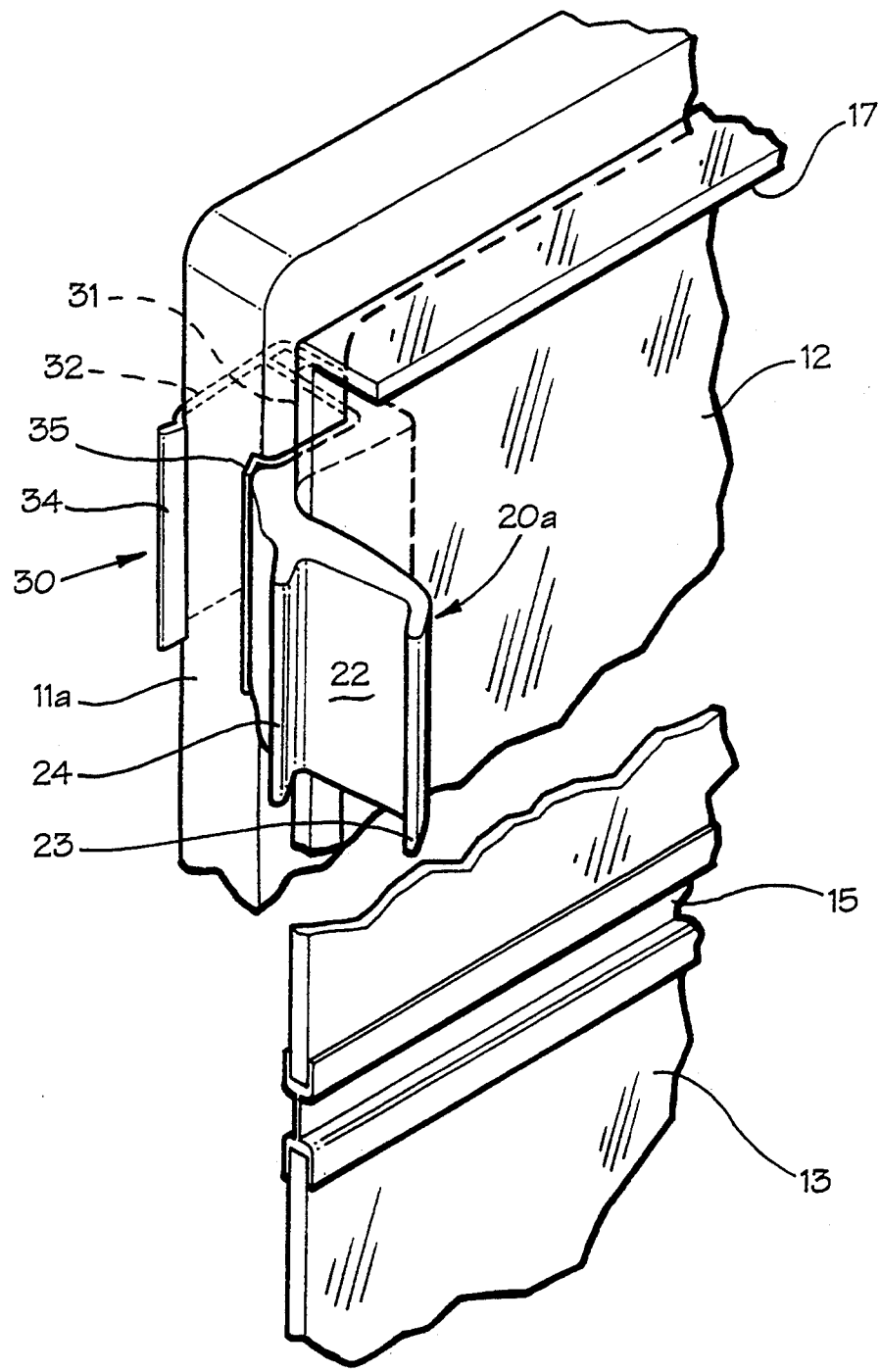
FIG. 5 is a fragmentary perspective view of the windshield assembly showing the windshield retaining member flexed outwardly away from the upper windshield panel to permit movement of the upper windshield panel downwardly to the open position.
Figure 6:
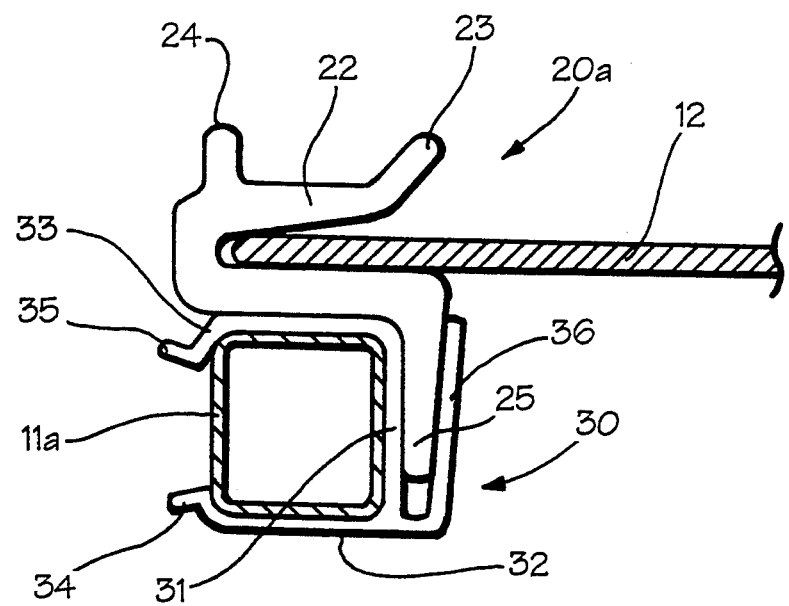
FIG. 6 is a top plan view of the fastener and retainer clip connected together and attached to the front support post of the golf cart, and showing the windshield retaining member of the retainer clip in the panel holding position.
Figure 7:
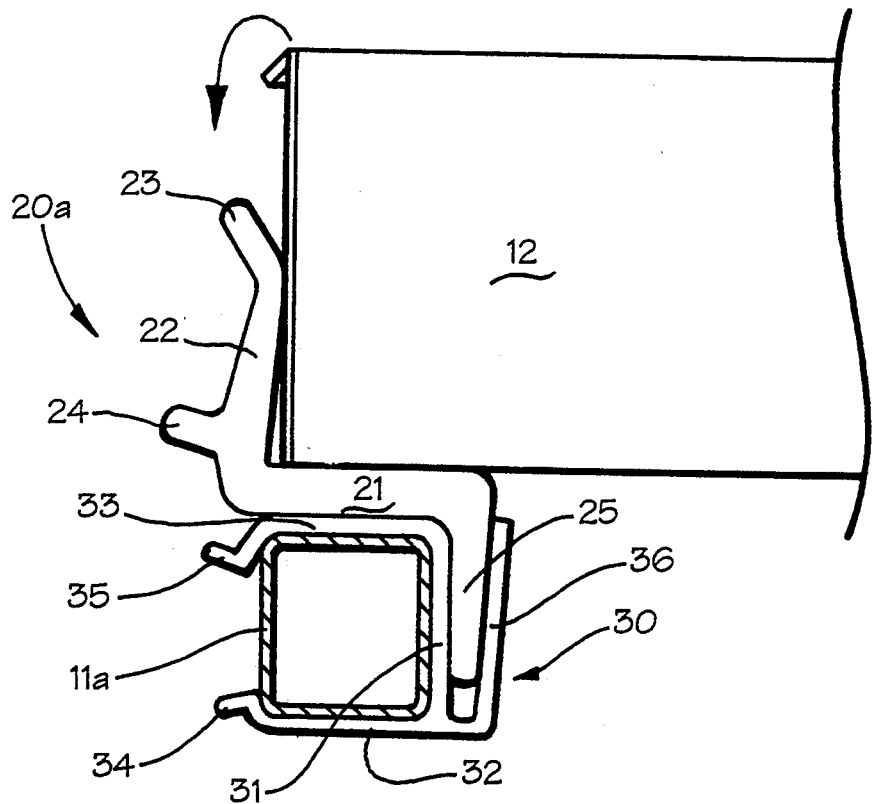
FIG. 7 is a top plan view of the fastener and retainer clip connected together and attached to the front support post of the golf cart, and showing the windshield retaining member of the retainer clip in the panel release position.

In addition, the fastener 30 may include a backing 36 formed with the web panel 31, and extending substantially parallel to the web panel 31 to define a space for receiving the extension 25. The backing 36 provides additional surface area for adhering the extension 25 to fastener 30. FIG. 3 illustrates the orientation of the retainer clip 20A and fastener 30 prior to attachment with the rubber cement adhesive.

In an alternative embodiment (not shown), the fastener and retainer clip may be integrally molded as a single unit. A small interior trim screw may be inserted through the web panel of the fastener to securely connect the retainer clip to the front support posts of the golf cart.

An improved windshield assembly is described above. Various details of the invention may be changed without departing from its scope. Furthermore, the foregoing description of the preferred embodiment of the invention and the best mode for practicing the invention are provided for the purpose of illustration only and not for the purpose of limitation-the invention being defined by the claims.

I claim:

1. In a split-panel windshield assembly of the type for attachment to at least one of a pair of laterally spaced and vertically extending front support posts of a recreation vehicle, and including a lower windshield panel for being attached to a lower portion of respective front support posts and an upper windshield panel pivotally connected along a top side edge of the lower windshield panel, the upper windshield panel being movable from a closed position generally above and coplanar with the lower windshield panel to an open position generally forward of and beside the lower windshield panel, the improvement in said windshield assembly comprising retaining means located on at least one of said front support posts to releasably hold said upper windshield panel in the closed position, said retaining means comprising:
   (a) fastener means removably attached to the front support post of said recreation vehicle; and
   (b) a retainer clip carried by said fastener means and including a windshield retaining member, the windshield retaining member and fastener means defining a windshield panel retaining space therebetween for holding said upper windshield panel in the closed position.

2. In a split-panel windshield assembly of the type for attachment to at least one .of a pair of laterally spaced and vertically extending front support posts of a recreation vehicle, and including a lower windshield panel for being attached to a lower portion of respective front support posts and an upper windshield panel pivotally connected along a top side edge of the lower windshield panel, the upper windshield panel being movable from a closed position generally above and coplanar with the lower windshield panel to an open position generally forward of and beside the lower windshield panel, the improvement in said windshield assembly comprising retaining means located on at least one of said front support posts to releasably hold said upper windshield panel in the closed position, said retaining means comprising:
   (a) a fastener having a web panel and first and second spaced-apart legs connected thereto, said first and second legs extending outwardly from said web panel for releasably embracing the front support post of said recreation vehicle;
   (b) a retainer clip including a flexible windshield retaining member carried by one of said first and second legs in spaced-apart relation thereto, the windshield retaining member and the one of said first and second legs defining a windshield panel retaining space therebetween; and
   (c) said windshield retaining member being movable from a panel holding position adjacent to the upper windshield panel for holding the upper windshield panel in the closed position, to a panel release position generally perpendicular to the upper windshield panel for permitting outward movement of said upper windshield panel to the open position.

3. An improved windshield assembly according to claim 2, wherein said retainer clip further includes an attachment member connected to an outside surface of one of said first and second legs and integrally formed at one end thereof with said windshield retaining member, said attachment member and said windshield retaining member cooperating to releasably hold said upper windshield panel therebetween in the windshield panel retaining space.

4. An improved windshield assembly according to claim 3, wherein said attachment member is connected to the outside surface of said one of the first and second legs by a rubber cement adhesive.

5. An improved windshield assembly according to claim 3, wherein said retainer clip further includes an extension integrally formed at one end thereof with said attachment member and extending perpendicular to said attachment member along an outside surface of the web panel of said fastener.

6. An improved windshield assembly according to claim 5, wherein said extension is connected to the outside surface of said web panel by a rubber cement adhesive.

7. An improved windshield assembly according to claim 5, wherein said fastener further includes a backing connected to said web panel and positioned in spaced-apart relation thereto, said backing extending parallel to said web panel and defining a space therebetween for receiving the extension.

8. An improved windshield assembly according to claim 2, wherein said retainer clip further includes at least one hand grip located on an outer surface of the windshield retaining member for receiving pressure applied by the thumb or forefinger of the user to flex said windshield retaining member outwardly from the panel holding position to the panel release position.

9. An improved windshield assembly according to claim 2, wherein said retainer clip includes first and second spaced apart hand grips integrally formed with an outer surface of said windshield retaining member for receiving pressure applied by the thumb or forefinger of the user to flex said windshield retaining member outwardly from the panel holding position to the panel release position, said first hand grip located generally at the free end of said windshield retaining member and said second hand grip located generally at the opposite end of said windshield retaining member.

10. An improved windshield assembly according to claim 2, wherein the retainer clip is constructed of rubber.

11. An improved windshield assembly according to claim 2, wherein said fastener is constructed of a synthetic resin.

12. An improved windshield assembly according to claim 2, wherein the retainer clip includes an ultraviolet inhibitor to provide protection from damage and wear caused by the sun.

* * * * *